(12) United States Patent
Blase

(10) Patent No.: US 6,612,104 B2
(45) Date of Patent: Sep. 2, 2003

(54) ENERGY GUIDING CHAIN

(75) Inventor: Günter Blase, Bergisch Gladbach (DE)

(73) Assignee: Igus Spritzgussteile fur die Industrie GmbH, Cologne (DE)

( * ) Notice: Subject to any disclaimer, the term of this patent is extended or adjusted under 35 U.S.C. 154(b) by 0 days.

(21) Appl. No.: 09/956,662

(22) Filed: Sep. 20, 2001

(65) Prior Publication Data

US 2002/0124548 A1 Sep. 12, 2002

Related U.S. Application Data

(62) Division of application No. 09/674,634, filed as application No. PCT/DE99/01351 on May 5, 1999.

(30) Foreign Application Priority Data

May 5, 1998 (DE) .......................... 198 19 845
Aug. 28, 1998 (DE) .......................... 198 39 270

(51) Int. Cl.[7] .................. F16G 13/00; F16G 15/10
(52) U.S. Cl. ...................... 59/78.1; 248/49; 248/51
(58) Field of Search ............ 59/78.1; 248/49, 248/51

(56) References Cited

U.S. PATENT DOCUMENTS

| | | | |
|---|---|---|---|
| 2,975,807 A | 3/1961 | Waninger | 59/78.1 |
| 3,053,358 A | 9/1962 | Gross et al. | 189/36 |
| 3,948,041 A | 4/1976 | Borjesson | 59/78.1 |
| 4,462,565 A | 7/1984 | Johnson | 59/78.1 |
| 4,813,224 A * | 3/1989 | Blase | 59/78.1 |
| 5,134,251 A * | 7/1992 | Martin | 59/78.1 |
| 5,711,733 A | 1/1998 | Blase | 474/227 |
| 5,980,409 A | 11/1999 | Blase | 474/218 |
| 6,156,974 A | 12/2000 | Blase | 59/78.1 |
| 6,367,238 B1 * | 4/2002 | Fischer | 59/78.1 |
| 6,425,238 B1 * | 7/2002 | Blase | 59/78.1 |

FOREIGN PATENT DOCUMENTS

| | | |
|---|---|---|
| DE | 1131964 | 6/1962 |
| DE | 24 17 516 | 4/1974 |
| DE | 27 28 442 | 6/1977 |
| DE | 39 28 236 | 8/1989 |
| DE | 39 28 237 | 8/1989 |
| DE | 39 29 095 | 9/1989 |
| DE | 195 41 928 | 11/1995 |
| DE | 298 21 259 | 11/1998 |
| GB | 1 444 307 | 7/1976 |
| JP | 60-125441 | 7/1985 |
| JP | 03 213748 | 12/1991 |

* cited by examiner

*Primary Examiner*—David Jones
(74) *Attorney, Agent, or Firm*—Drinker Biddle & Reath LLP

(57) ABSTRACT

An energy guiding chain for guiding hoses, cables and the like has a number of chain links connected to one another in articulated fashion which are formed by parallel straps connected by cross-members. The energy guiding chain can be moved in such a way that it forms an upper strand, a lower strand and a deflection zone connecting the two, where the upper strand rests on the lower strand. In order that the upper strand can be moved lying on the lower strand with the least possible power and low wear, and the chain is of the simplest possible design, at least some of the chain links of the upper strand and/or the lower strand are provided with rollers that can roll on running surfaces provided on the chain links of the opposite strand when the energy guiding chain travels.

23 Claims, 16 Drawing Sheets

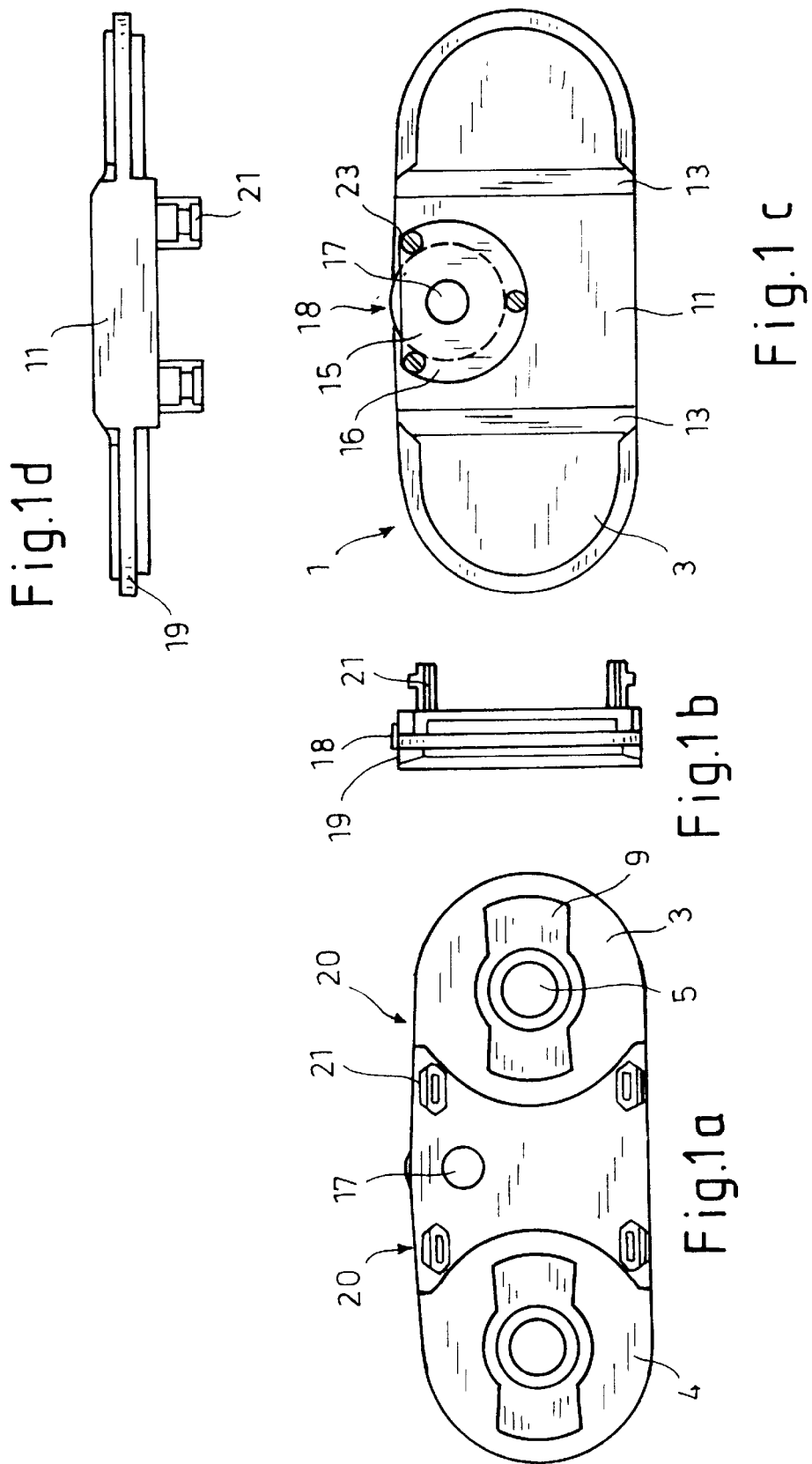

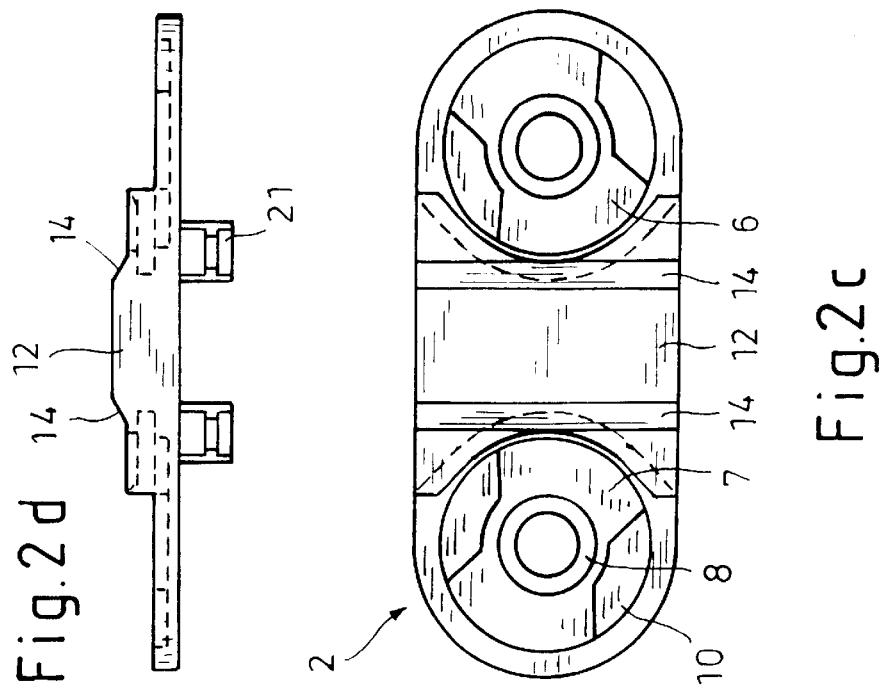
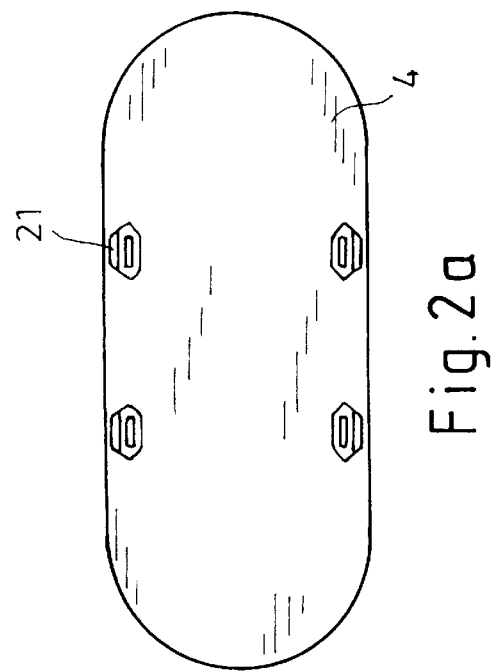

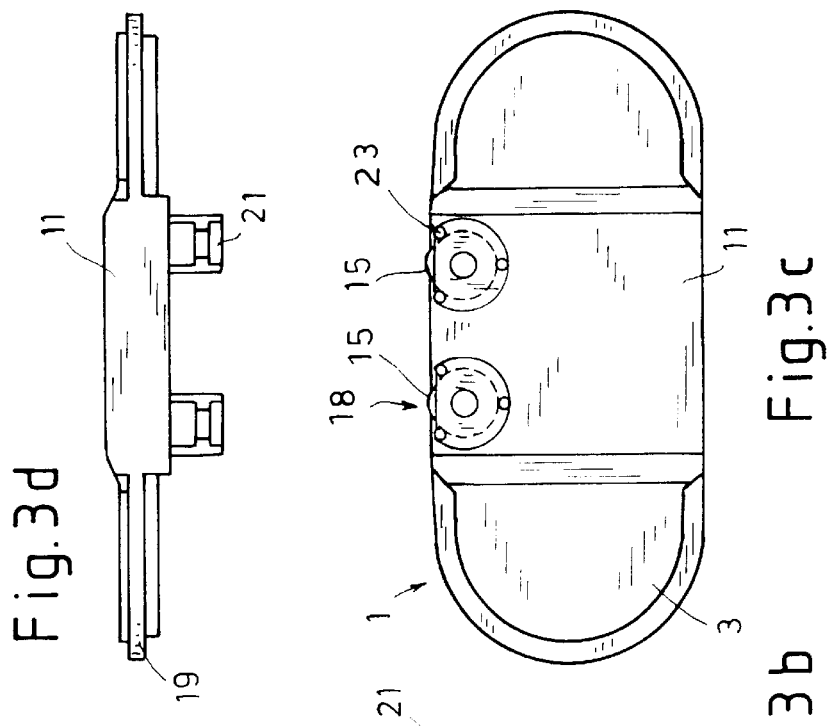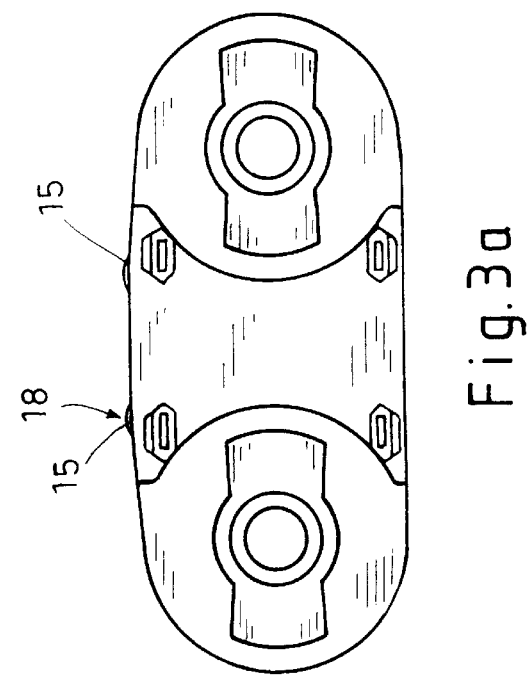

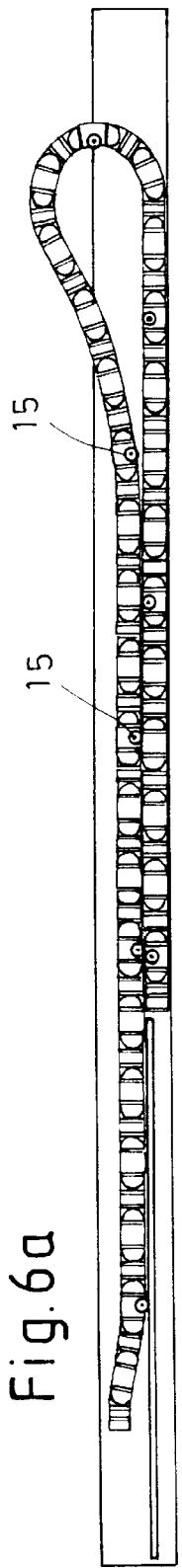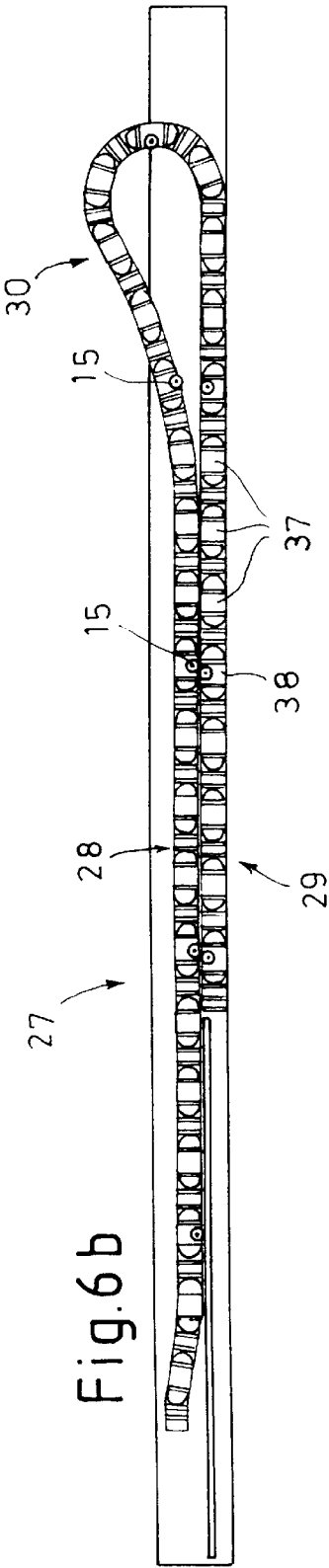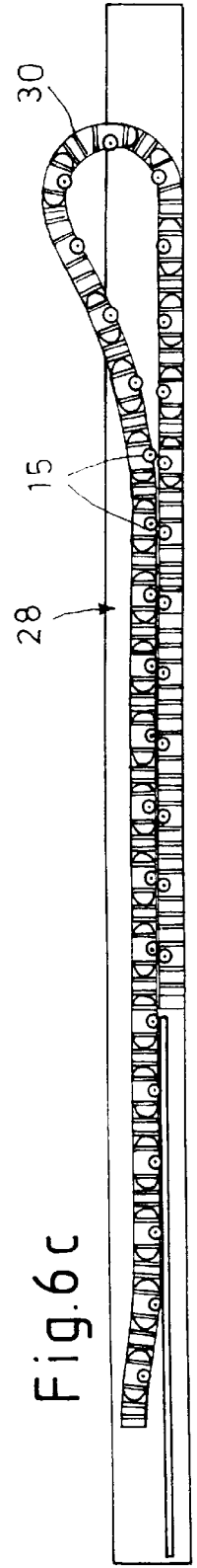

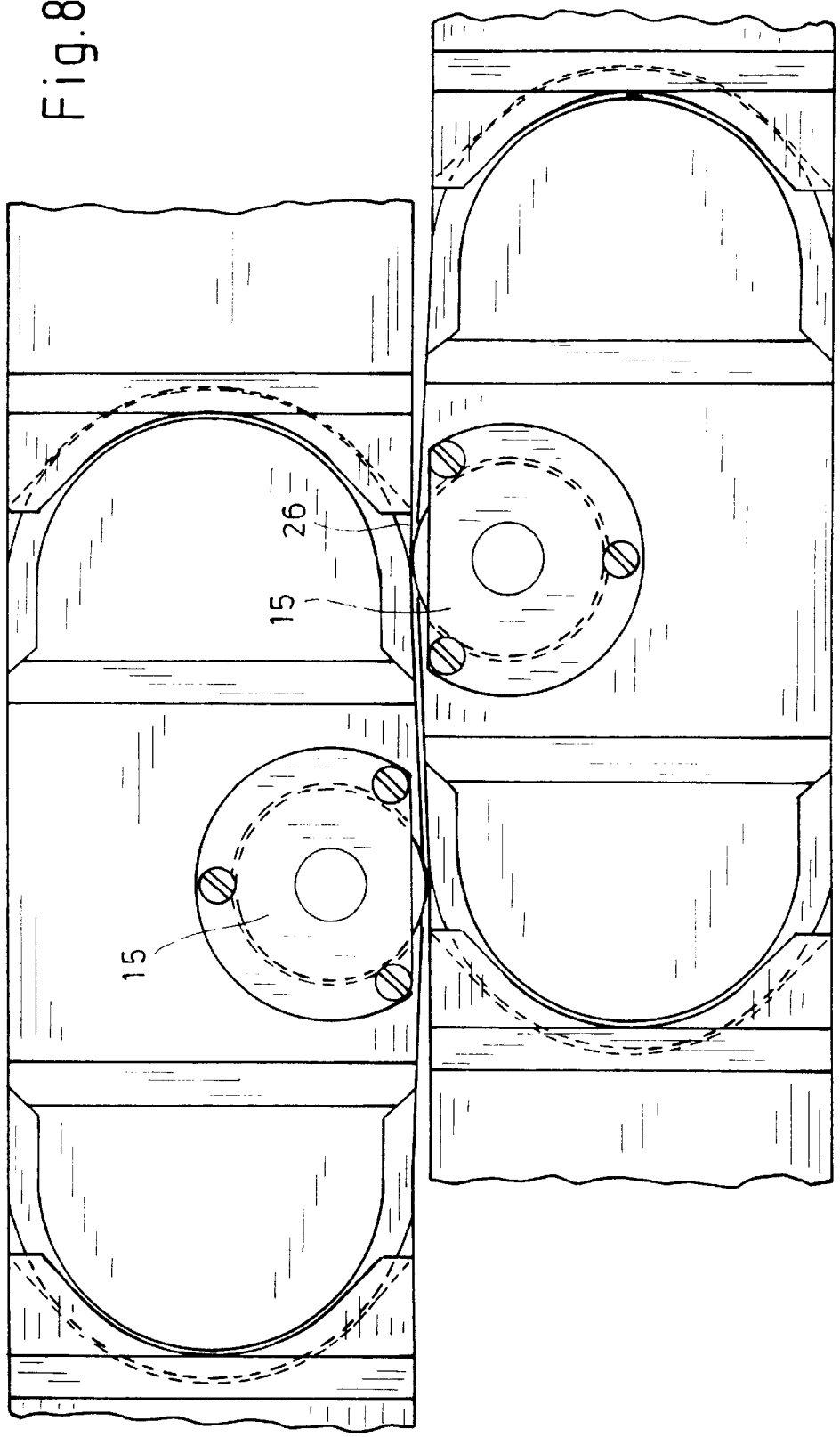

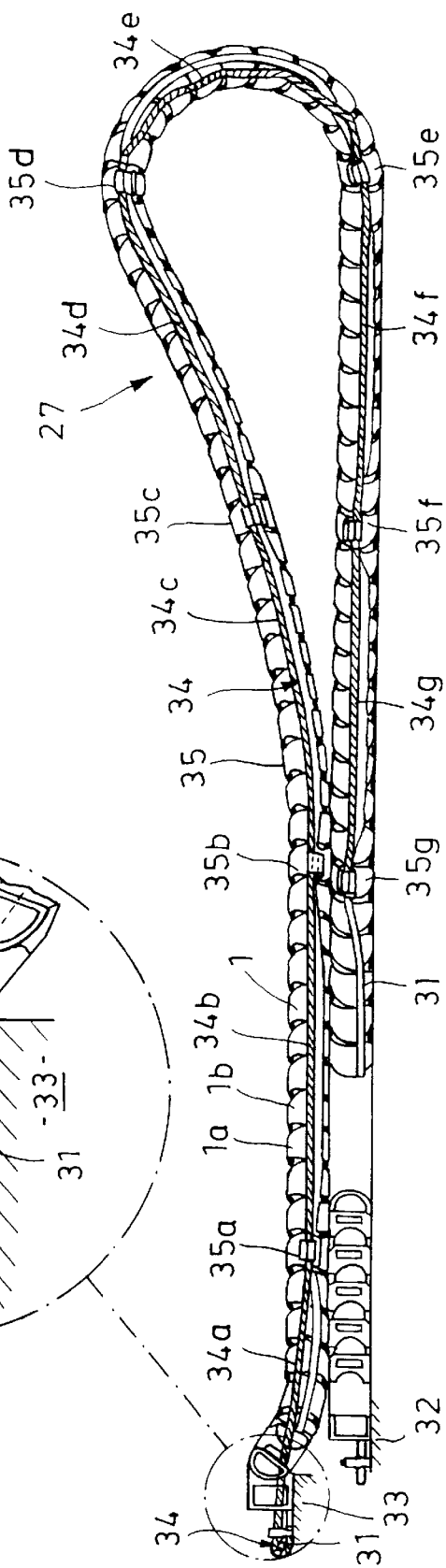
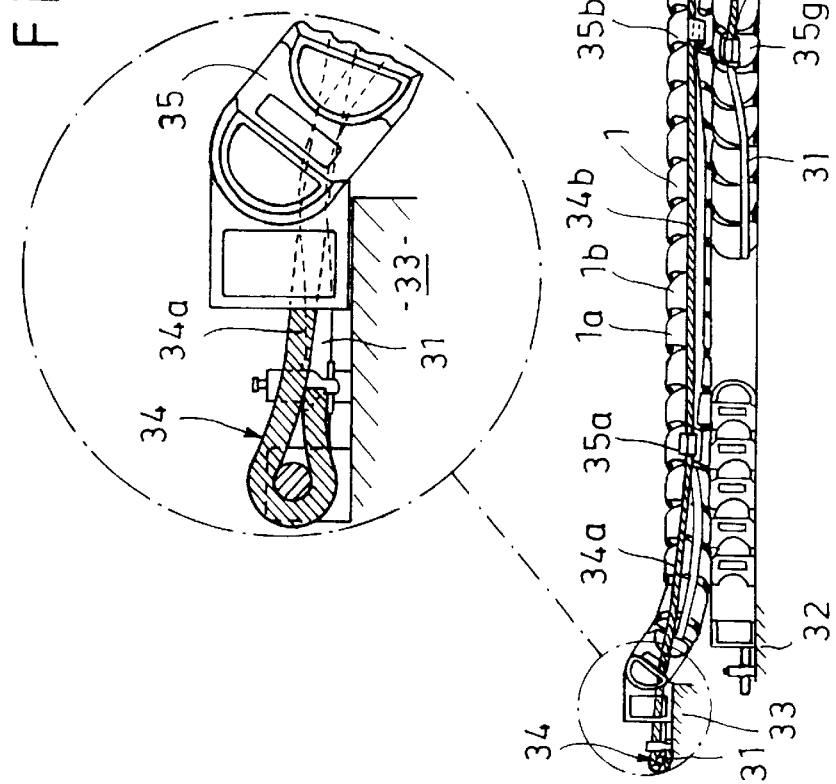

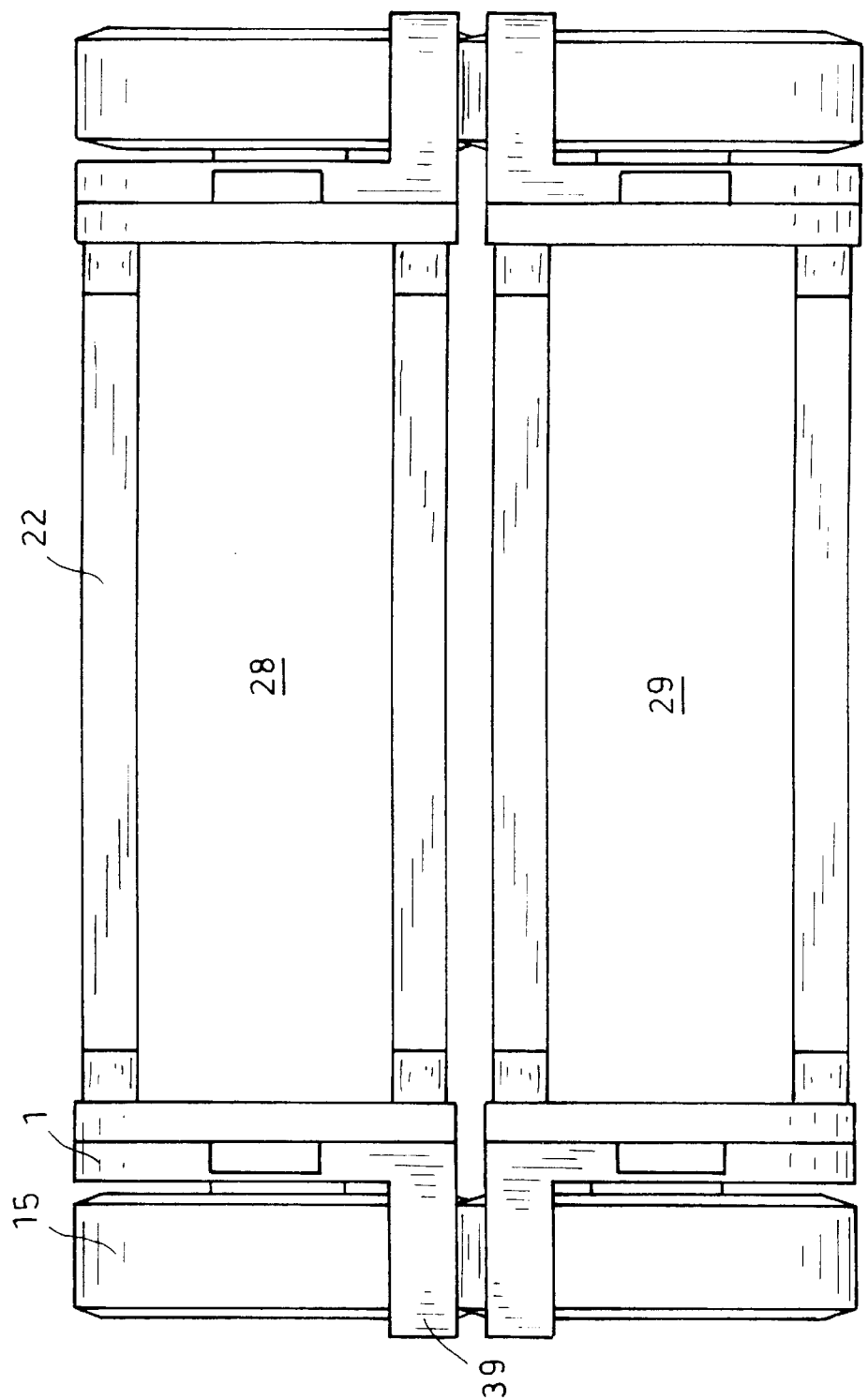

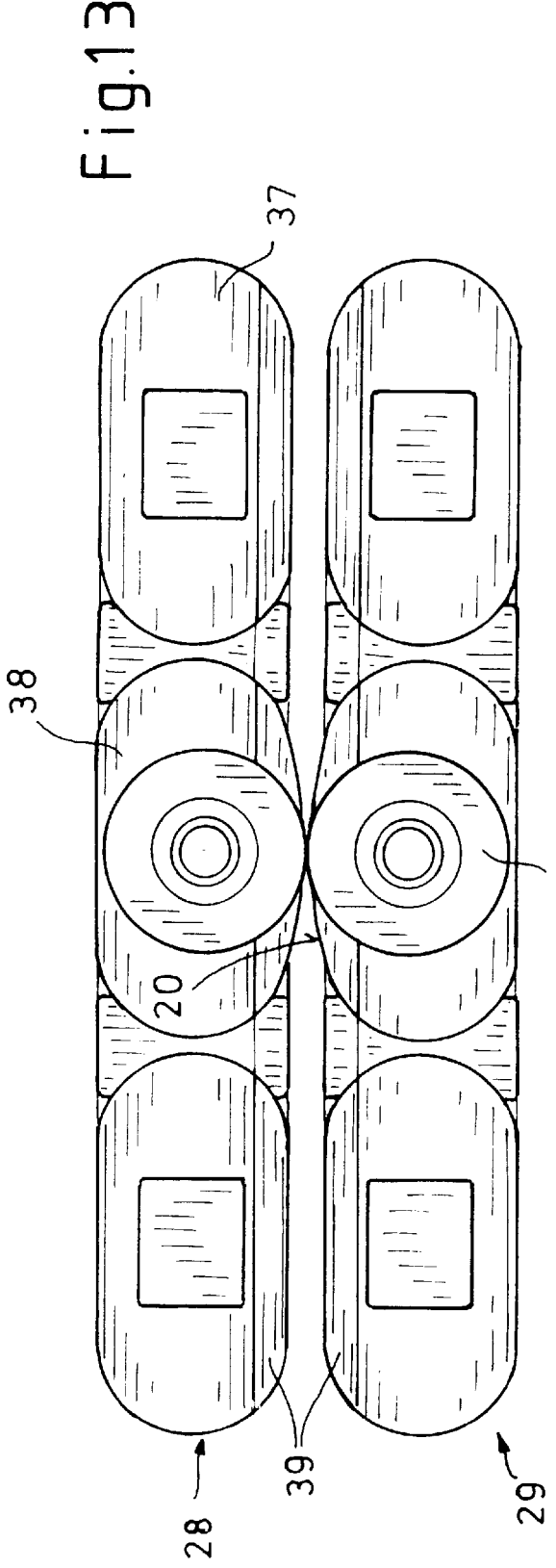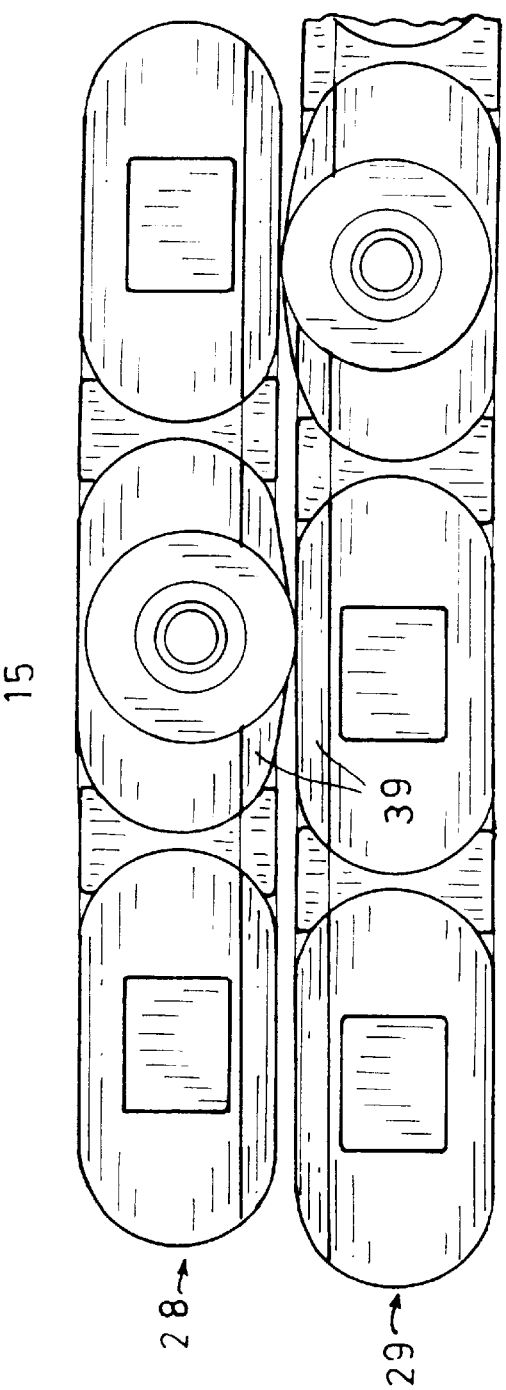

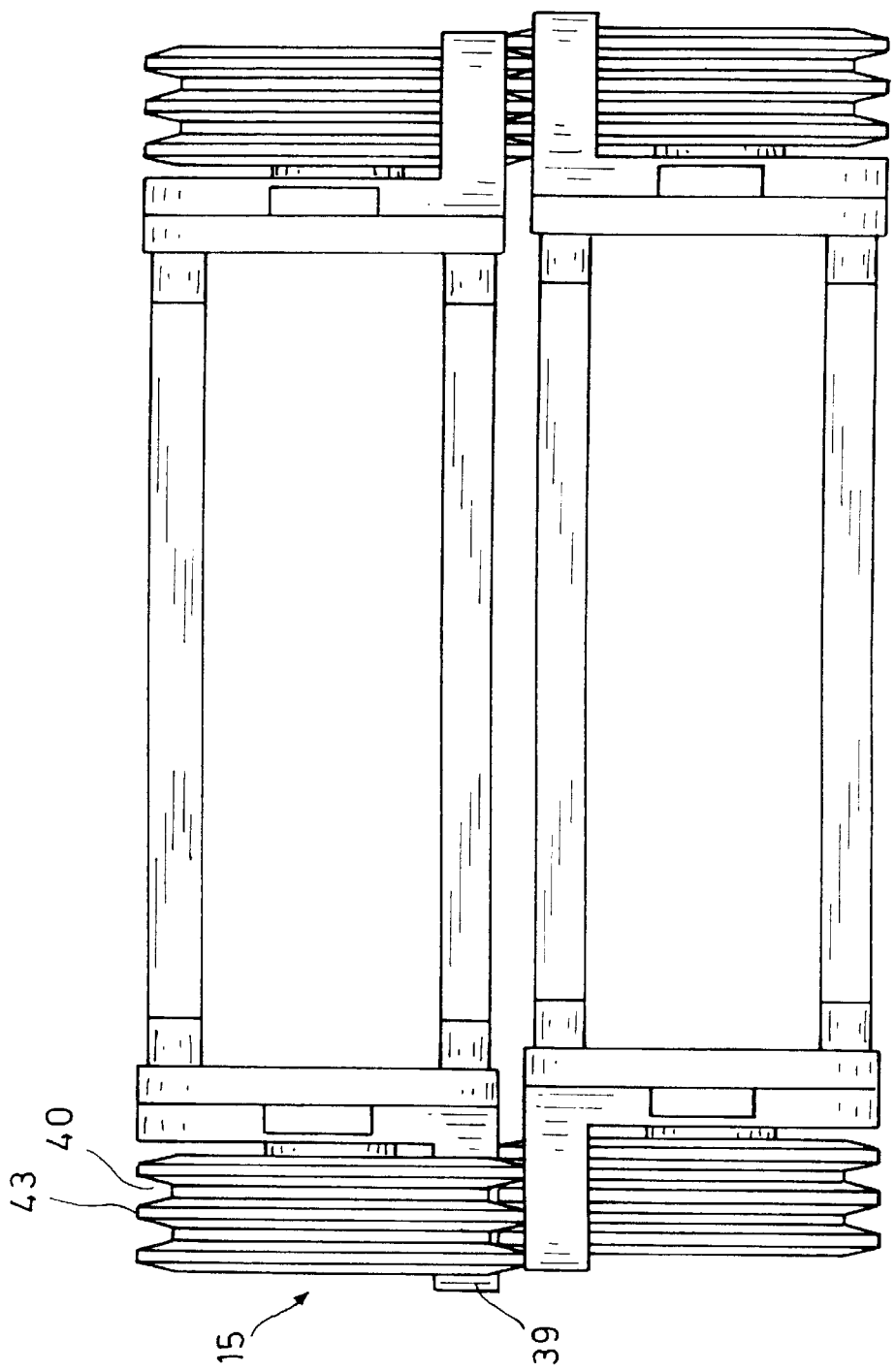

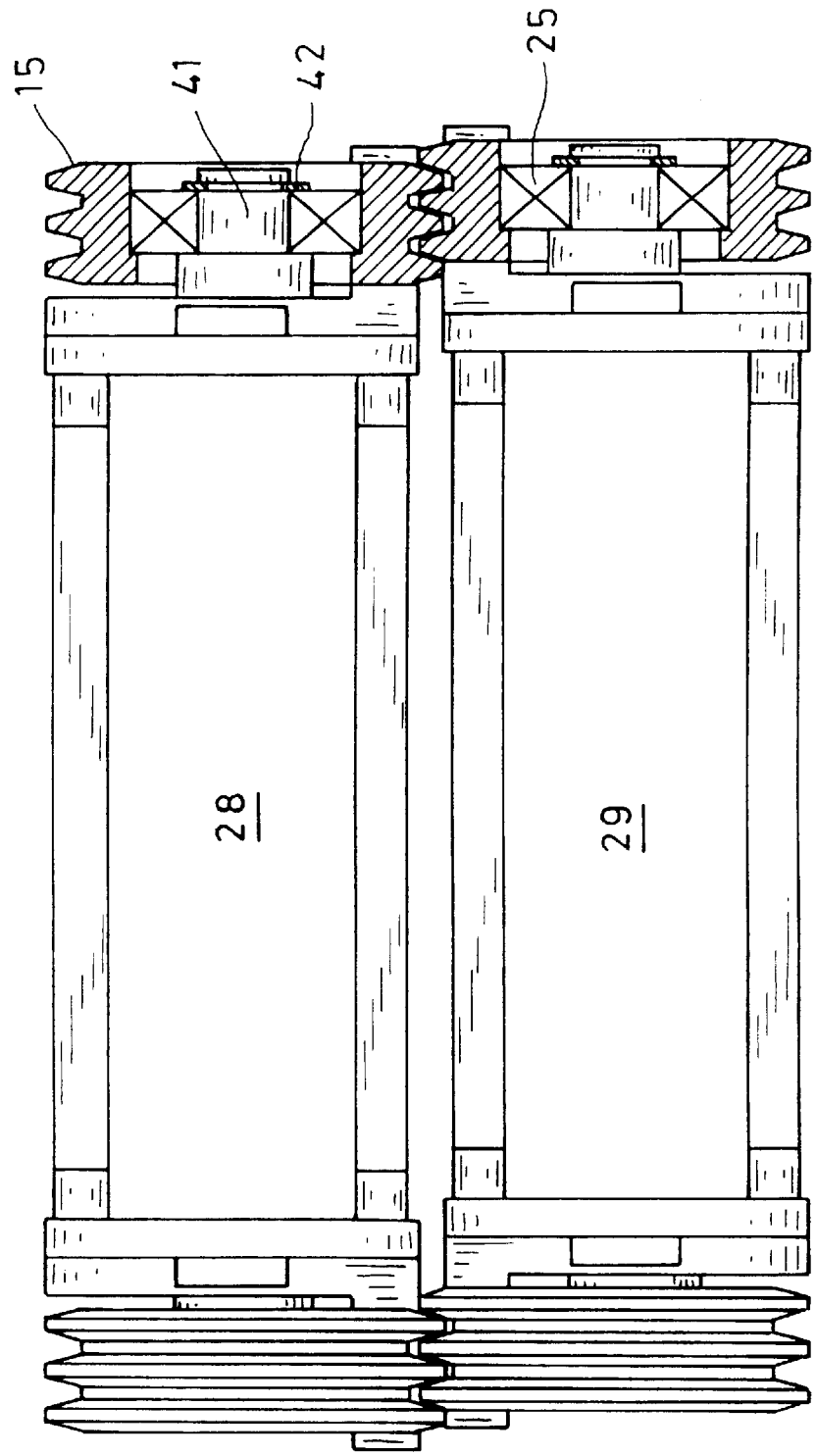

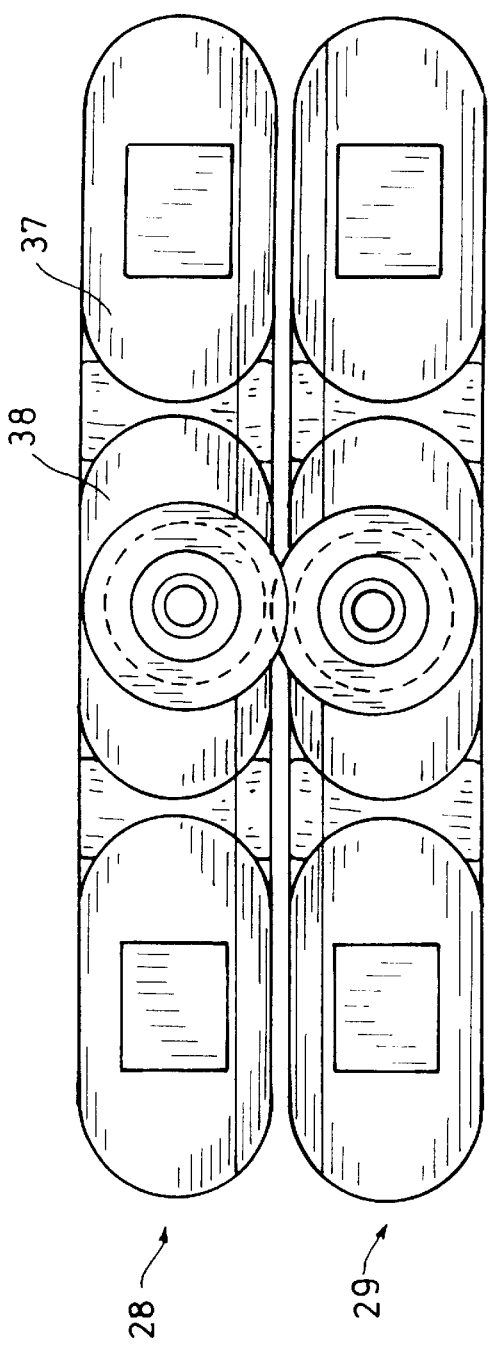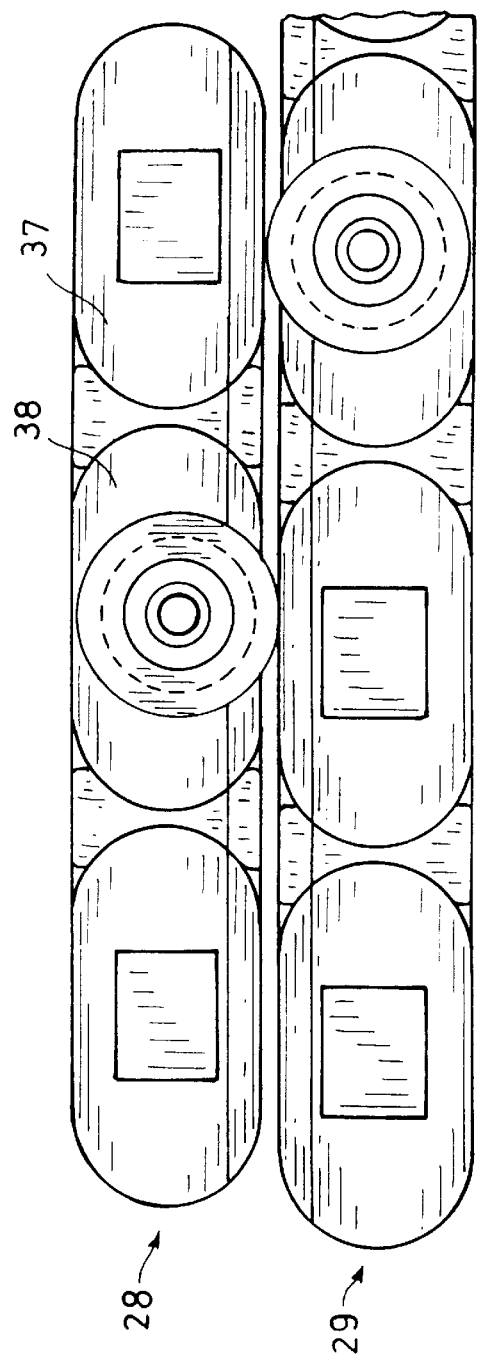

ENERGY GUIDING CHAIN

CROSS REFERENCE TO RELATED APPLICATIONS

This application is a divisional of U.S. patent application Ser. No. 09/674,634, filed May 5, 1999, which is herein incorporated in its entirety.

FIELD OF THE INVENTION

The invention relates to an energy guiding chain for guiding cables, hoses and the like, having a number of chain links connected to one another in articulated fashion which are formed by parallel straps connected by cross-members, which energy guiding chain can be moved in such a way that it forms an upper strand, a lower strand and a deflection zone connecting the two, where the upper strand rests on the lower strand, and where at least some of the chain links of the upper strand and/or the lower strand are provided with rollers which are arranged in such a way that, when the energy guiding chain travels, they can roll on running surfaces provided on the chain links of the opposite strand.

Furthermore, the invention relates to an energy guiding chain for guiding cables, hoses and the like, having a number of chain links connected to one another in articulated fashion which are formed by parallel straps connected by cross-members, which energy guiding chain can be moved in such a way that it forms an upper strand, a lower strand and a deflection zone connecting the two, where the upper strand rests on the lower strand.

BACKGROUND OF THE INVENTION

In some applications, energy guiding chains of this kind are of a considerable length which can be in the region of 100 meters or more. Thus, the drive must provide correspondingly high drive power in order to move the energy guiding chain. This is especially the case if the upper strand of the energy guiding chain rests on the lower strand during travel, as the corresponding sliding friction, which reaches a substantial magnitude with very long energy guiding chains, has to be overcome. The respective sliding surfaces of the chain links are subject to increased wear due to the friction between the upper strand and the lower strand.

As considerable tensile forces are required to move the energy guiding chain, a change in length also occurs in the energy guiding chain which can easily amount to up to roughly 8%, referred to the length of the unstressed chain. This change in length occurs as a result of the ever-present play between the chain links and the ever-present elasticity of the chain links. This elongation of the energy guiding chain generates corresponding stress on the hoses or the like guided by the energy guiding chain.

It is common practice to provide special support structures for particularly long energy guiding chains that support the upper strand so that the upper strand can be moved on this support structure. In order to facilitate the movement of the energy guiding chain, some of the chain links are provided with rollers that can roll along the support structure. However, the arrangement of support structures of this kind is very complex and, in addition, the support structure cannot be used when moving an energy guiding chain in which the upper strand is arranged above the lower strand. In this case, it has been proposed to design the support structure in such a way that the supporting members can be swung out to the side in order to be removed from the range of motion of the energy guiding chain. However, this requires a corresponding swivel mechanism, which requires appropriate maintenance and also restricts the travel speed of the energy guiding chain. On the whole, there are many fields of application of energy guiding chains in which support structures are not expedient, quite apart from the technical resources they require.

GB 1 444 307 A discloses an energy guiding chain in which the chain links are provided with supporting areas which are oriented in such a way that they combine to form a flat surface. The supporting areas are provided at the inner side of the loop of the energy guiding chain. Predetermined chain links are provided with supporting wheels which protrude beyond the plane of the adjacent supporting area, through a recess provided in the supporting area. An energy guiding chain is thus provided by means of which the supporting forces can be dissipated via the chain links in a favorable manner so that the chain links can be of light construction and higher supporting forces can be distributed.

SUMMARY OF THE INVENTION

The object of the present invention is to design an energy guiding chain in which the upper strand can be moved lying on the lower strand with the least possible power and low wear, and which is of the simplest possible design, and by which a simply constructed guidance of the energy transmission chain is provided, even in case of long energy guiding chains.

According to the invention, the object is solved in that the rollers have a guide profile, which is formed by several circumferential guide grooves positioned at a distance from one another in the running surface of the rollers. By these features of the rollers according to the present invention the travel characteristics can be further improved and an emission of noise can be further reduced, furthermore, friction between the lower strand and the upper strand can be lowered. Simultaneously, a reliable guidance of the energy guiding chain is provided.

Furthermore, it is an object of the present invention to provide an energy guiding chain having increased stability of the chain links, especially in case of long chain links.

According to the invention, this object is solved in that two cross-members at a distance from one another in the longitudinal direction of the chain are provided on one narrow side of a chain link.

When the rollers of two chain links equipped with rollers running on top of one another meet, they become offset by roughly the width of one groove due to the geometry of the guide grooves, so that the profiles of the meeting rollers mesh. The elasticity of the energy guiding chain easily permits the upper strand and the lower strand to run slightly offset relative to one another. This offset roughly corresponds to the width of one guide groove. This advantageously prevents the convergence of the two superposed strands when two rollers meet.

It is particularly advantageous if the depth of the guide grooves is at least equal to the distance the roller projects beyond the running surface of the associated chain strap. The rollers then need no longer climb up and down one another, and a considerable amount of tensile force that would otherwise have to be applied to the upper strand is eliminated. Approaching rollers can simply pass through one another.

The guide grooves are expediently provided with a roughly trapezoidal cross-sectional profile, which ensures the correct alignment of the rollers relative to one another.

In this context, the rollers in the sense of the invention should be taken as being elements that rotate when they contact the running surfaces and move relative to them. For example, areas on the chain straps projecting out to the side can be provided as running surfaces.

As a result of these measures, the upper strand can travel directly on the lower strand by means of the rollers, while the friction between the upper strand and the lower strand is dramatically reduced due to the rollers provided in accordance with the invention. For example, the friction of the energy guiding chain according to the invention is roughly 6 or more times less than that of a conventional energy guiding chain of similar design, meaning that the chain can be 6 or more times longer with the same drive.

Furthermore, as a result of the rollers provided, there is considerably less elongation of the chain as compared to conventional energy guiding chains travelling at the same speed. The wear on the contact surfaces between the upper strand and the lower strand is also markedly reduced.

As the running surfaces for the rollers of the opposite strand are located directly on the chain links, it is possible to design the energy guiding chain to be particularly lightweight, meaning that the length of the energy guiding chain and its travel speed can be correspondingly high.

The rollers can be directly mounted on the chain straps using appropriate bearings, and the roller mount can be correspondingly stable. Thus, separate connectors are not required.

The rollers are preferably located in recesses provided on the chain straps, with the rollers projecting at least slightly beyond the chain straps towards the opposite strand. The axis of rotation of the rollers is located inside the cross-section of the chain straps.

The running surfaces for the rollers can be directly formed by the narrow sides of the chain straps facing the opposite strand. In this context, the chain straps can be designed in such a way that a continuous running surface is formed when the energy guiding chain is extended, so that there are no or only slight differences in the level of the running surface, particularly in the joint sections of the chain straps.

The recesses for accommodating the rollers in the chain straps can be of closed design in the lateral direction of the chain straps, i.e. perpendicular to the longitudinal direction of the energy guiding chain. The pockets formed in this way, which are only open to one side, make it possible to design an energy guiding chain with a completely enclosed interior.

In order to ensure minimum surface pressure on the running surfaces, the width of the rollers should be as large as possible. To this end, the chain straps can, if necessary, be provided with wider sections of corresponding width in the region of the rollers, where the wall thickness of the chain straps can decrease towards the joint sections or towards the longitudinal center of the chain straps.

One, two or more rollers can be provided on each narrow side of the chain straps, the rollers being spaced apart from one another in the longitudinal direction of the energy guiding chain, so that the stress on the rollers and the bearings can be distributed over several different rollers in each case.

The straps can be connected by a cross-member positioned in the middle of the chain strap or midway between the two or more rollers, as appropriate. The narrow sides of opposing straps are preferably connected by two cross-members, which can, in particular, be located on the side straps immediately adjacent to the joint or end sections, thus increasing the stability of the chain links, particularly in the case of long links. In this way, the straps can be connected by four cross-members or, if appropriate, by only three or two cross-members. It is particularly advantageous for the cross-members to be provided with wider sections on the side, which partially cover the inside of the adjacent strap. If top and bottom elements are to be provided on the cross-members, so that a completely closed cable channel results, the distance between adjacent cross-members on one narrow side of the straps and the strap length are advantageously twice as large as on the chain links without rollers. The links provided with rollers can thus be fitted with twice as many standard top and bottom elements as the links used previously, in order to form a closed channel without requiring special parts.

In another configuration, each chain strap can be provided with at least one roller mounted in the middle of the chain strap, with cross-members arranged in front of or behind the roller in the longitudinal direction of the energy guiding chain—preferably in front of and behind it. A configuration with several cross-members is particularly advantageous if the chain straps are longer due to the rollers mounted on them.

In order to improve the travel characteristics of the energy guiding chain, the running surfaces can have run-up bevels rising towards the rollers. In this way, the height of the rollers projecting beyond the chain straps can be reduced for any given arrangement of the axis of rotation, this having an advantageous effect on the quiet running of the energy guiding chain.

In order to mount the rollers in the recesses of the chain straps, flanges can be provided which have a bearing section for the rollers, where the flanges can have sections of greater radial dimensions in relation to the axis of rotation of the rollers, these sections being provided with means for attaching the flanges to the chain straps. The rollers can be mounted on one or both sides of the flanges. The axles can also be mounted on one side of the flange and on the opposite section of the chain strap.

If the chain straps are provided with recesses for accommodating the rollers, means can be provided with which the recesses can be bridged on the side towards the opposite strand. This can be achieved by using corresponding caps, for example. This can prevent the rollers of one strand from running into recesses in the chain links of the opposite strand, if no rollers are mounted in these recesses.

In particular, standard chain links can also be provided between the chain links with rollers. In this way, the energy guiding chain can essentially consist of the previously known chain links, between which chain links additionally provided with rollers are mounted at intervals of several chain links, for example.

The chain straps can also be alternatively or additionally designed in such a way that they are provided with recesses for accommodating rollers on one of the narrow sides running parallel to the longitudinal direction of the chain, where the opposite narrow side of the chain strap has no recesses, and where the chain straps are designed in such a way that they can be mounted with either of the narrow sides facing the opposite strand. The same chain strap can thus be optionally used for assembly with or without rollers. For this purpose, the chain strap need only be rotated 180° about its longitudinal axis, or about the axis which extends through the center plane of the chain straps perpendicular to their longitudinal direction.

The links with rollers have a greater length, i.e. a greater pitch than the conventional chain links. Exceeding certain pitch dimensions is not desirable, as this generates uneven running of the chain through the deflection radius, especially when links with very different lengths are connected in alternating fashion. Therefore, one configuration of the invention provides that the rollers be mounted on the side of the chain straps projecting outwards and that wider sections of the chain straps projecting out to the side be provided as running surfaces. In this way, the pitch of the chain links without rollers can be retained on chain links with rollers.

In a configuration of the energy guiding chain such as this, at least all the chain straps of one strand—both the outer and inner straps—are expediently provided with a wider section which forms a running surface, so that at least one essentially closed running surface is formed along the length of the energy guiding chain.

Each of the rollers can penetrate a window-like recess in the wider sections which form the running surfaces.

The rollers can be distributed over the chain links in different ways. It is not always necessary to provide every chain link with rollers, so the rollers can also be mounted on the energy guiding chain at intervals of more than one chain link. In this context, an equal distance can be provided between the rollers so that, for example, only every fourth, fifth, etc. chain link is provided with opposing rollers.

However, the rollers can also be distributed over the length of the energy guiding chain at irregular intervals. Thus, the rollers can be distributed at greater repeat periods, within which the distance between the rollers can, for example, alternate, so that, starting at one chain link, rollers can be mounted after three, then five, then three chain links, etc., in the longitudinal direction of the chain. In this context, the distribution of the rollers over the chain links can also be random.

In addition, it is not necessary to provide both chain straps of the same chain link with rollers, meaning that the distribution of the rollers over the various strands of chain straps need not be symmetrical.

An irregular or asymmetrical distribution of the rollers has the advantage that, at certain times during the movement of the energy guiding chain, not all the rollers are in contact with one another simultaneously, but rather only a few of them, where the time between contact of the rollers can vary. In this way, the slight jolts caused by the meeting of the rollers can be distributed irregularly over the energy guiding chain, so that jerky movements along the entire length of the energy guiding chain can be avoided when it is travelling rapidly. This can improve the quiet running of the energy guiding chain.

Depending on the operating conditions of the energy guiding chain, the chain straps can be provided with rollers that project beyond the longitudinal axis of the chain straps on one side, on the opposite side, or on both sides of the chain straps. In this way, these rollers can be optionally mounted in the region of the upper strand or the lower strand or, if the energy guiding chain can move on both sides of the end point, on both sides of the chain straps.

It is also particularly possible to provide rollers on energy guiding chains that have more than two parallel strands of chain straps, in which case rollers are to be provided on at least two strands. For example, the rollers can be located exclusively on the outer strands, and they can instead or additionally be provided on one or more of the inner strands of chain straps.

It is particularly advantageous if, in at least one area of the chain adjacent to the moving driver of the energy guiding chain, sections of chain links are interconnected, and the chain link closest to the driver is connected to the driver in tension-resistant fashion by at least one element which is essentially inextensible in the longitudinal direction of the chain and flexible in the bending direction of the chain. An element of this kind is described in German Patent Application DE 198 07 083, the entire contents of which are incorporated herein.

Because of the arrangement of the inextensible element on the energy guiding chain in combination with the arrangement of the rollers, the chain can be moved over very great lengths with minimum power and without elongating the energy guiding chain under tensile stress. This generally enables energy guiding chains of particularly great length to be controlled and thus opens up new fields of application for energy guiding chains.

The sections in which the chain links connected by one or more inextensible elements are arranged advantageously comprise several chain links. The sections can be of equal or unequal length. Unequal lengths are preferably used, with the sections becoming shorter towards the driver, because the tensile stress on the chain increases towards the driver.

The inextensible element, or at least one of them if there are several, can be one of the lines guided in the chain. The inextensible element, or at least one of the inextensible elements, is preferably arranged separately from the lines. The element or elements arranged separately from the lines can be provided in the interior of the chain and consists of steel cables, for example. However, any other kind of element that displays these characteristics is also conceivable.

Adjacent ones of the chain links located at the ends of the individual sections are preferably interconnected, and the closest of these chain links to the driver if preferably connected to the driver in tension-resistant fashion by at least one element which is inextensible in the longitudinal direction of the chain and flexible in the bending direction of the chain.

The inextensible element(s) is/are preferably mounted in tension-resistant fashion on strips arranged separately from the cross-members, the strips being connected to the opposing straps of the chain links.

The lines guided through the chain are advantageously secured to these strips by clamps, which can also be provided with fastening elements for the ends of the steel cables or other appropriate inextensible elements.

The strips can have pins on the ends lying in the transverse direction of the chain, which assume the function of link pins for the associated chain links. This means that the pins on the straps form a positive connection by reaching through two aligned openings in the overlapping areas of directly adjacent chain links and thus form the hinge axes between these chain links. This configuration permits the lines and the separate inextensible elements mounted on the strips to be arranged in pivoting fashion about the hinge axes.

The strips can have projections on the ends lying in the transverse direction of the chain, which engage correspondingly shaped grooves on the inside of the chain links between the joint sections. The grooves provided in all chain links of a chain series can also be used to mount other parts between the chain straps.

The energy guiding chains according to the invention can consist of inner and outer straps, as well as angled chain links. The cross-members can in each case be mounted in detachable fashion on the side straps or integrally molded on them, or they can be of such a width that they form a closed channel. The joint connections can be of any design, such as integral hinges or the like.

BRIEF DESCRIPTION OF THE DRAWINGS

The invention is described in detail below and an example explained based on the drawings. The drawings show the following:

FIGS. 1a–1d, herein collectively referred to as FIG. 1, illustrate different views of an outer strap of an energy guiding chain according to the invention, FIGS. 2a–2d, herein collectively referred to as FIG. 2, illustrate different views of an inner strap of an energy guiding chain according to the invention, FIGS. 3a–3d, herein collectively referred to as FIG. 3, illustrate a second configuration of an outer strap, FIGS. 4a and 4b, herein collectively referred to as FIG. 4, illustrate a cross-section of a chain strap taken through a roller, FIG. 5 A top view of a section of an energy guiding chain, FIGS. 6a–6c, herein collectively referred to as FIG. 6, illustrate side views of three energy guiding chains with the upper strand resting on the lower strand and different roller distributions, FIGS. 7 and 8 Enlarged views of an energy guiding chain according to FIG. 6 in different travel positions, FIGS. 9a and 9b, herein collectively referred to as FIG. 9, illustrate a cross-section of an energy guiding chain with the upper strand resting on the lower strand in different travel positions, FIGS. 10a and 10b, herein collectively referred to as FIG. 10, illustrate a side view of an energy guiding chain with an inextensible element connecting the driver and chain links, FIG. 11 A view of a second configuration of the energy guiding chain according to the invention with the upper strand resting on the lower strand, where the rollers are located on the side of the chain straps projecting outward, FIG. 12 A partially cut-away view of the illustration in FIG. 11, FIGS. 13 and 14 Side views of an energy guiding chain with the upper strand resting on the lower strand according to the second practical example of the invention, FIG. 15 An illustration of an energy guiding chain with the upper strand resting on the lower strand according to a third practical example of the invention, in which the rollers have a profile, FIG. 16 A partially cut-away view of the illustration in FIG. 15, and FIGS. 17 and 18 A side view of the energy guiding chain according to the third practical example of the invention in different travel positions of the energy guiding chain.

DETAILED DESCRIPTION OF THE DRAWINGS

Figure 4A:
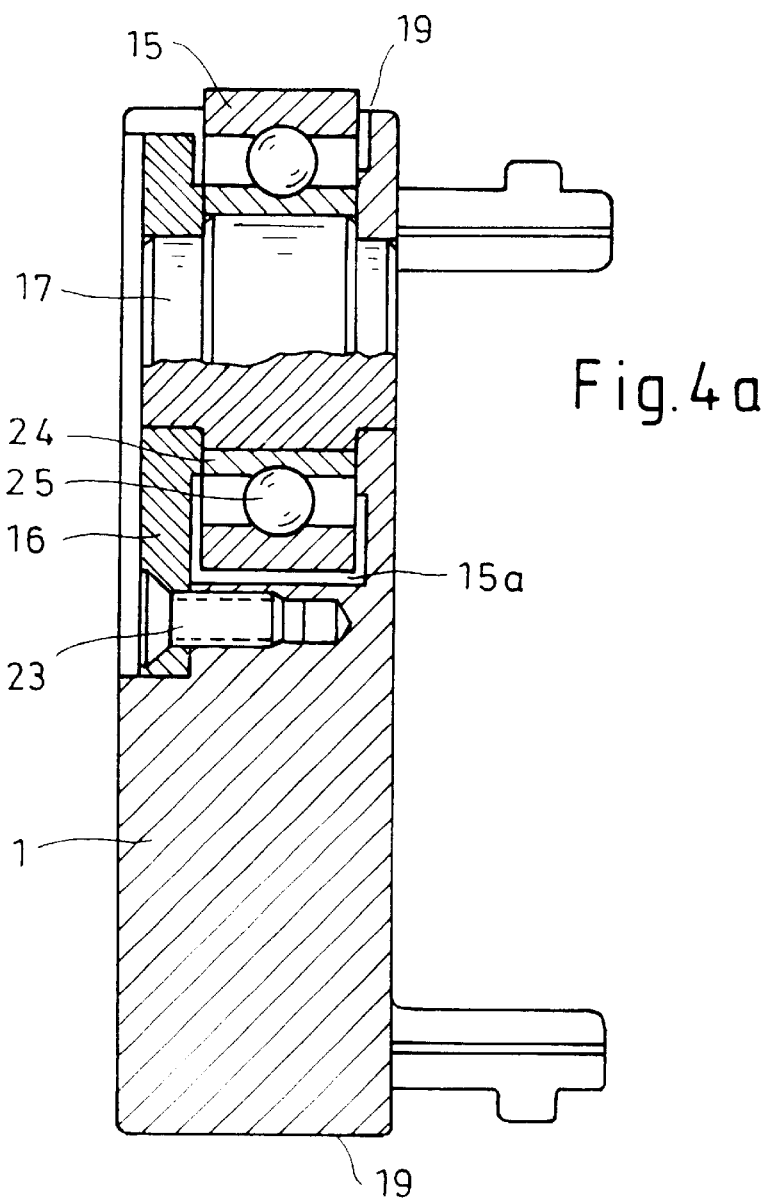

The chain strap 1 shown in FIG. 1 is designed as an outer strap, which is connected to an inner strap 2 (shown in FIG. 2) in articulated fashion to form a strand. For this purpose, link pins 5 are provided on end sections 3, 4 of outer straps 1 and corresponding pin guides 8 on end sections 6, 7 of inner straps 2, as well as corresponding pairs of stops 9, 10 to restrict the swivel angle.

Straps 1, 2 are each symmetrical about the center plane perpendicular to the longitudinal axis of the straps.

Middle sections 11, 12 of chain straps 1, 2 are designed as wide sections and merge on the side of straps 1, 2 facing away from the chain interior, via bevels 13, 14 running perpendicular to the longitudinal axis of the straps, into end sections 2, 3.

A roller 15 is mounted in rotating fashion in an arc-shaped recess 15a in middle section 11 of outer strap 1 by means of a flange 16. Axle 17 of the roller is fixed at one end by flange 16 and at the opposite end in a recess in the chain strap.

Protruding area 18 of roller 15 can roll over a running surface located on the chain links of the opposite strand, so that the upper strand can move lying on the lower strand.

Figure 7:
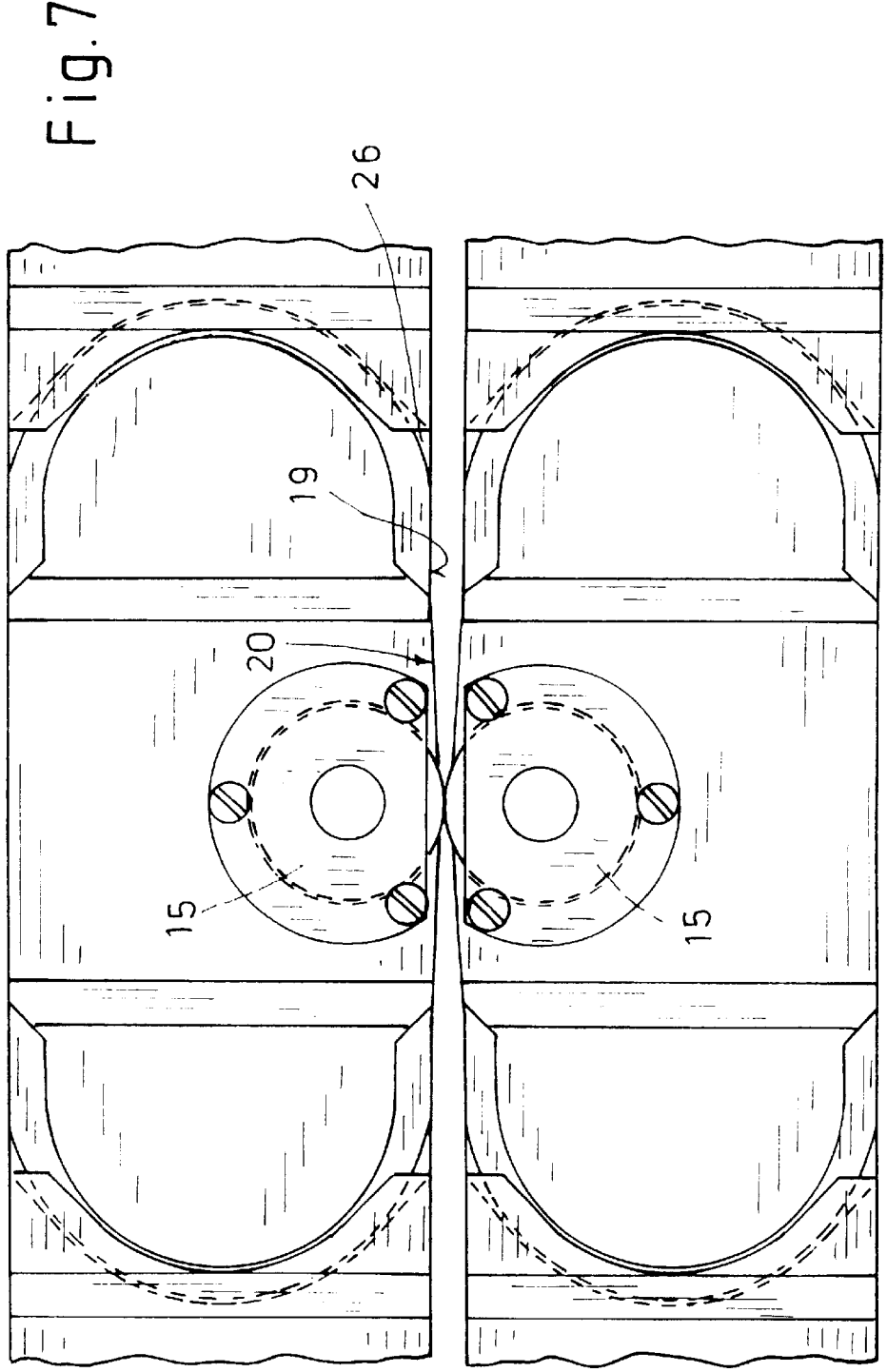

In the embodiment, narrow sides 19 of the chain straps (see FIG. 9) serve as running surfaces for the rollers of the opposite strand and essentially extend between the swivel axes of adjacent chain links defined by the joint sections (FIGS. 6 to 8). This ensures that, when the energy guiding chain is extended, no dips are formed between the running surface sections 26 of adjacent chain straps level with the joint connections, thus resulting in a continuous running surface for the rollers over the length of the chain with very little or no differences in height.

Running surface or narrow side 19 has run-up bevels 20 extending in the longitudinal direction of the energy guiding chain and positioned before and after roller 15, which rise towards rollers 15 and essentially start level with the swivel axes of the straps. In this context, the slope of run-up bevels 20 is relatively small and can, for example, climb a height of about 3 mm over a length of 80 mm. Area 18 of roller 15 projects above the apex of run-up bevel 20 by about another 2 mm.

The inner straps, and the narrow sides of the outer straps without rollers, do not have any run-up bevels in the embodiments shown.

In the practical example shown, the diameter of rollers 15 is essentially half the height of chain strap 1.

Thus, the run-up angle to the rollers (angle between the circumferential surface of the roller and the run-up bevel) is relatively small. However, rollers with a considerably smaller diameter relative to the height of the chain straps can also be used.

Due to the widening of middle sections 11, 12 of chain straps 1, 2, it is also possible to widen the running surface for the rollers at this location, which results in less surface pressure on narrow sides 19 of the chain straps and thus in a further reduction of the material stress.

Figure 5:
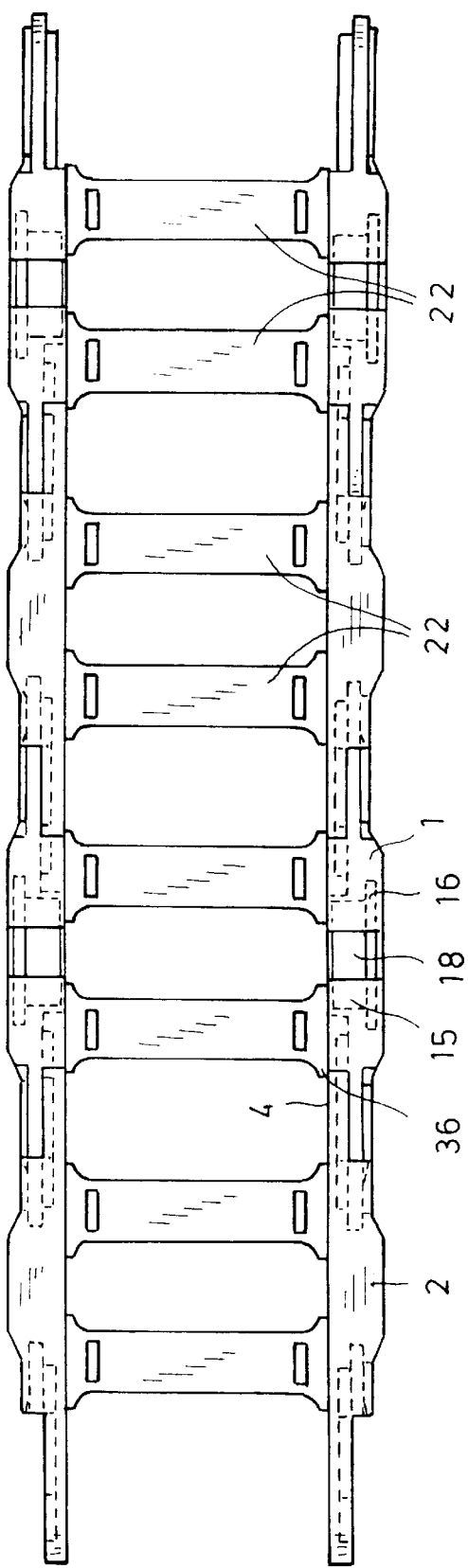

As FIGS. 1, 2, 3 and 5 also show, pairs of pins 21 for mounting cross-members 22 are arranged level with the widened middle sections 11, 12 at a substantial distance from one another, so that opposing inner and outer straps are connected by four cross-members, thus increasing the stability of the chain links. The pins 21 on the outer strap are arranged before and after roller 15 in the longitudinal direction of the energy guiding chain. Cross-members 22 of the inner straps are also mounted at a distance from one another (FIG. 5). If the opposite side of chain strap 1 is not provided with a roller (as shown), the chain straps on this side can also be optionally connected by a single cross-member positioned level with the roller.

According to the embodiment in FIG. 3, two (or possibly more) rollers can also be mounted in series on one chain strap. The rollers are attached to the wider section by way of flanges in this embodiment also. As on the chain straps in FIGS. 1 and 2, cross-members 22 are arranged at the ends of the wider section. They can, if necessary, also be provided between the rollers. The running surface section between rollers 15 runs parallel to the opposing narrow side of the strap, As shown in FIGS. 4 and 9, rollers 15 roll over narrow sides 19 of chain straps 1 of the opposite strand until they come into contact with the rollers of the opposite strand and roll over them.

Figure 4B:
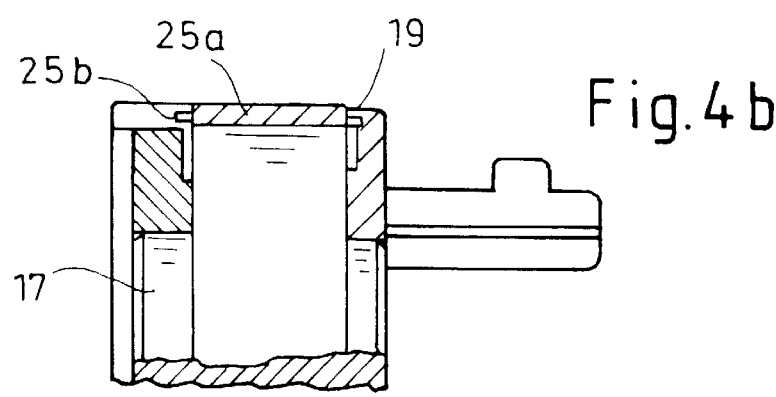
Figure 9B:
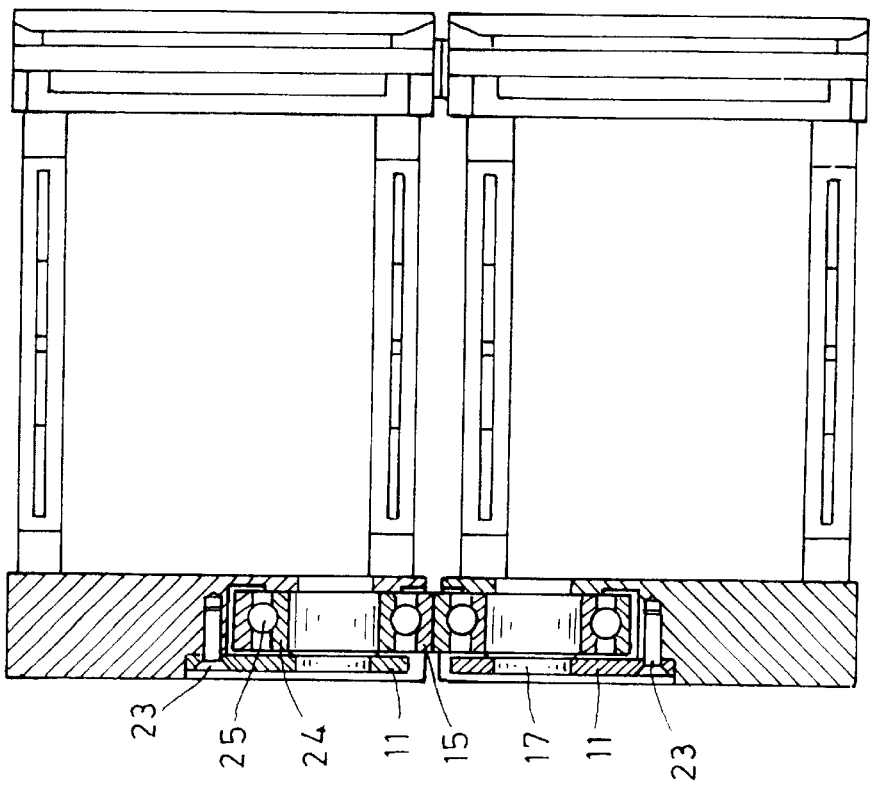
Figure 9A:
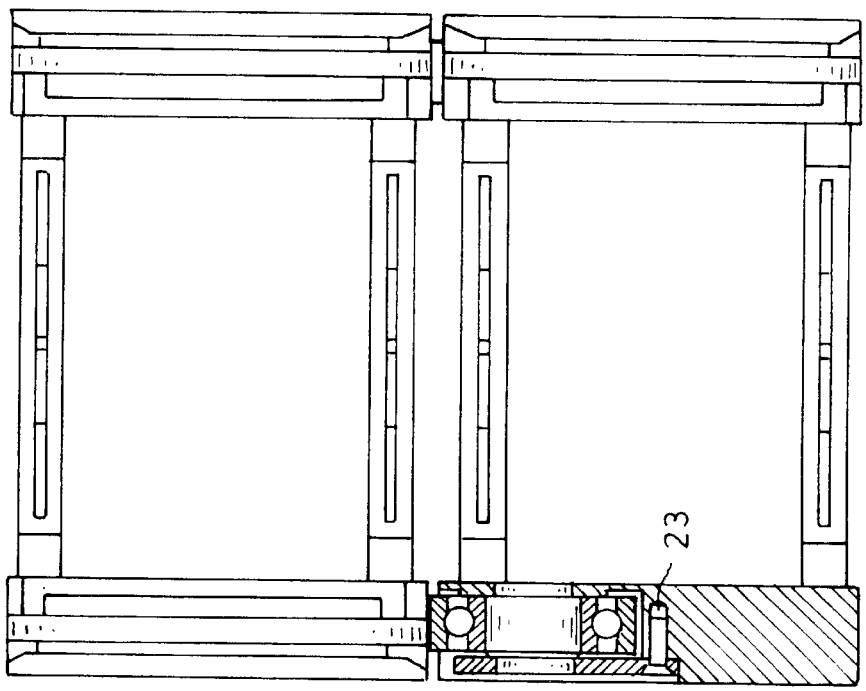

FIGS. 4 and 9 also show that one end of axle 17 of the roller is fixed by flange 16 and the opposite end by in recess 15a in the chain strap. The axle has a bearing race 24 of a ball bearing 25. Flanges 16 are mounted in non-rotating fashion on the chain straps by three studs 23 and are completely flush with strap 1, so that the flanges do not protrude to the side. In this context, rollers 15 take up about half the width of the chain straps. Flanges 11 can also be designed in such a way that they essentially enclose rollers 12.

The mounting of rollers 15 directly on the chain straps by means of flanges 11 results in particularly stable roller mounting. The rollers are located inside the cross-section of the energy guiding chain and the axes of rotation inside the cross-section of the chain straps, thus avoiding protruding regions.

Due to the fact that the height of areas 18 protruding beyond narrow sides 19 of chain straps 1 is relatively small compared to the diameter of rollers 15, it is possible to operate the energy guiding chain extremely quietly and smoothly.

As shown in FIG. 4 (bottom), when the roller is dismounted, the opening facing the respective narrow side 19 of the chain link can be covered with a cap 25a and snap elements 25b can be provided on the side strap in order to attach it, while the mounting elements for the roller can possibly remain assembled. The same cap or a separate one can possibly also be used to cover the side area of the side piece which serves to accommodate the mounting elements of the roller. The cap can be flush with the respective outside surface of the side strap.

As shown in FIG. 5, two cross-members 22 are arranged immediately adjacent to end sections 3, 4 on inner and outer straps. Wider sections 36 on the ends of cross-members 22 on outer straps 1 overlap the inside of end sections 4 of the inner straps with only little play, so that this overlap increases the stability of the chain.

In order to be able to move the upper strand on the lower strand by means of rollers 15 with little power, it is (as shown in FIG. 6) not necessary to provide every chain strap of energy guiding chain 27 with rollers. Rather, they can be spaced apart from one another on the chain straps, e.g. every third or fourth chain link. If the rollers are arranged closely, e.g. on every chain link, the rollers come into contact with the lower strand 29 first during the transition from deflection zone 30 to upper strand 28, thus avoiding sliding friction.

In the same energy guiding chain 27, chain links with rollers 38 can also be provided which are longer than chain links without rollers 37 (FIG. 6).

As shown in FIGS. 6 to 8, in a sufficiently stable energy guiding chain, the superposed upper strand is arranged in self-supporting fashion due to the slightly protruding rollers and rests on the lower strand only via the rollers, thus resulting in particularly low friction values in the event of relative motion of the upper and lower strand. Run-up bevels 20 (FIG. 7) expand the gap between the chain strands.

As another component which is of particular importance in connection with the rollers, the energy guiding chain can be fitted with a steel cable which is inextensible in the longitudinal direction of the chain and flexible in the bending direction of the chain, as shown in FIG. 10.

The illustration in FIG. 10 shows an energy guiding chain 27 for accommodating and guiding lines 31 between a stationary base 32 and a mobile driver 33 with two parallel strap strands consisting of opposing straps 1 in the transverse direction which are connected to one another by cross-members (not shown in FIG. 10). The immediately adjacent straps 1a and 1b of each strap strand can swivel relative to one another in the bending direction of the chain.

As is further shown in FIG. 10, one section of the chain, which extends from driver 33 over the upper strand and the bending region all the way to the lower strand of the chain, is equipped with elements 34 (34a, 34b, 34c, 34d, 34e, 34f and 34g) which are inextensible and flexible in the bending direction of the chain. These elements interconnect chain links 35a, 35b, 35c, 35d, 35e, 35f and 35g, which are mounted in the associated region of the chain separated from one another and from driver 33 by several chain links. Chain link 35a closest to driver 33 is connected to driver 33 via inextensible element 34a.

FIG. 11 shows a second embodiment of the energy guiding chain according to the invention. Here, rollers 15 are mounted on the outside of chain straps 1, 2. Rollers 15 are not covered. Wider sections 39 with an L-shaped cross-section, which are provided on the side of outer straps 1 and inner straps 2, serve as running surfaces and have window-like openings on those chain links 38 that have rollers 15, through which openings the rollers 15 project. The arrangement of rollers 15 on the outside of chain straps 1, 2 beyond the chain cross-section has the advantage that the pitch of chain links 38 with rollers can be smaller, i.e. as small as the pitch of chain links 37 without rollers.

Figure 12:
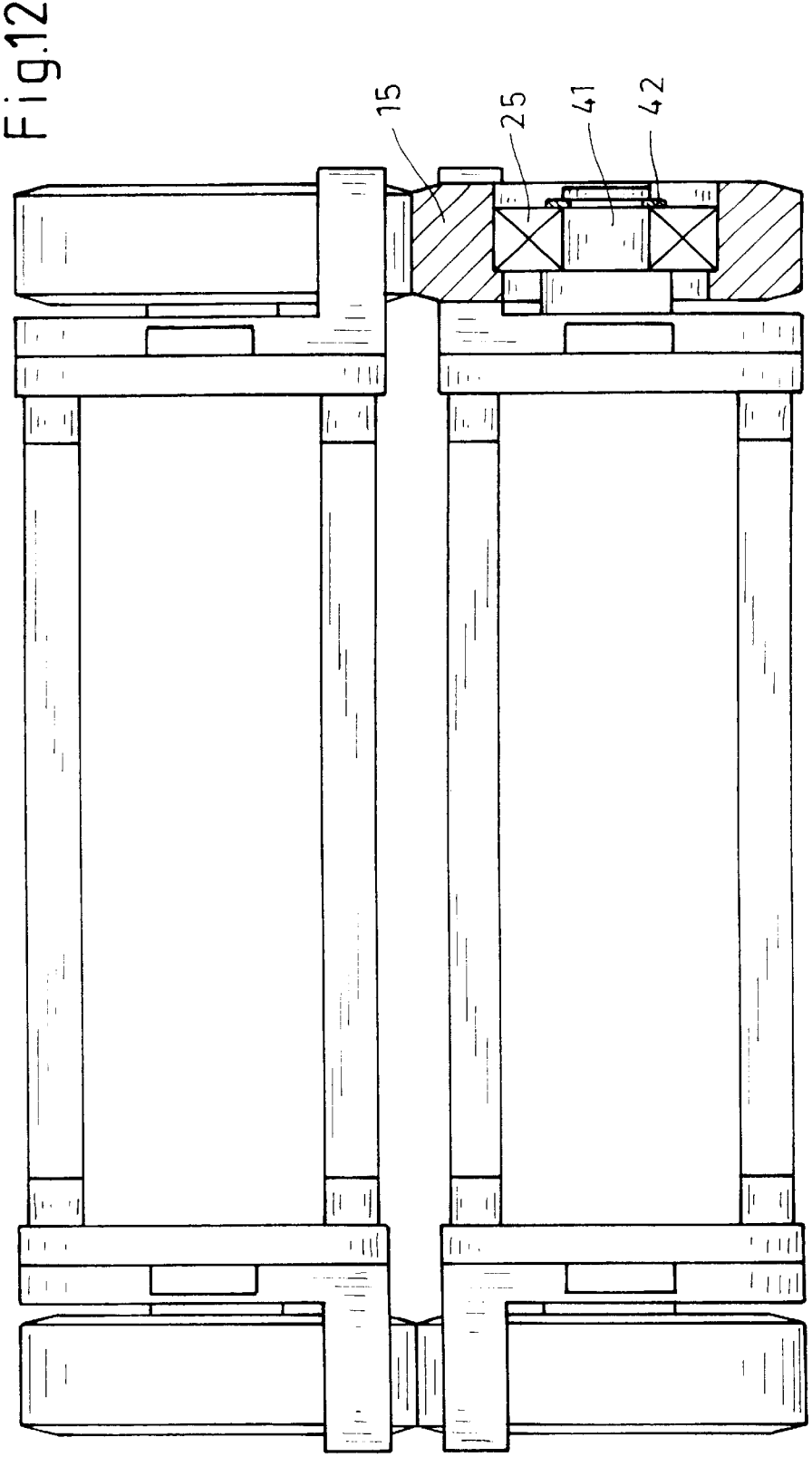

As is shown particularly clearly in the cut-away view in FIG. 12, rollers 15 are accommodated by ball bearings 25 (shown only roughly in the illustration), which are secured by means of a circlip 42 on a bearing pin 41 integrally molded on the outside of the associated chain strap 1.

Wider sections 39 with an L-shaped cross-section, which are provided on outer straps 1 and on inner straps 2 of both strap strands, each form a closed running surface for rollers 15 in the longitudinal direction, where, in this configuration, run-up bevels rising towards rollers 15 can also be provided, as can be seen in FIGS. 13 and 14.

FIGS. 13 and 14 show two different travel positions of the energy guiding chain, i.e. two different relative positions of chain links 38 with rollers. FIG. 14 shows chain links 38 with rollers in a laterally offset position. When rollers 15 of upper strand 28 and lower strand 29 meet, as shown in FIG. 13, upper strand 28 must rise in relation to lower strand 29, because roller 15 shown in upper strand 28 has to "climb" over run-up bevel 20 and roller 15 in lower strand 29. Run-up bevel 20 minimizes the projection of rollers 15 above the running surfaces of wider sections 39, so that rollers 15 do not jump over one another in jerky fashion, which would cause uneven running of the energy guiding chain.

FIGS. 15 to 18 show a particularly advantageous third embodiment of the energy guiding chain according to the invention, in which rollers 15 are provided with a guide profile, i.e. several all-round guide grooves 40 with a trapezoidal cross-sectional profile which are spaced apart from one another. Ridges 43 remaining between guide grooves 40 of two contacting rollers meet frontally which, because of the trapezoidal cross-section of the guide grooves, leads to a lateral offset in the relative position of upper strand 28 and lower strand 29, as shown in FIG. 15. This offset is roughly equal to the width of one guide groove 40, so that the rollers of upper strand 28 pass through those of lower strand 29. For this purpose, the depth of guide grooves 40 must, of course, be greater than or equal to the distance of rollers 15 from the running surfaces formed by wider sections 39.

The elasticity of the energy guiding chain easily permits upper strand 28 and lower strand 29 to be in an offset position of this kind over a relatively great distance, this ensuring extremely low friction values.

As is particularly clearly shown in FIG. 17, the rollers of the chain links of upper strand 28 pass through the chain links of lower strand 29 when the two meet.

The chain straps and rollers are preferably made of plastic. However, other combinations of materials are also possible. For example, the chain straps and/or rollers can also be made of metallic materials.

LIST OF REFERENCE NUMBERS

1 outer strap
2 inner strap
3,4 end section
5 link pin
6, 7 end section
8 pin guide
9, 10 pairs of stops
11, 12 middle section
13, 14 bevels
15 roller
15a recess
16 flange
17 rotation axle
18 area
19 narrow side
20 run-up bevel
21 pin
22 cross-member
23 stud
24 bearing shell
25 ball bearing
25a cap
25b snap elements
26 running surface section
27 energy guiding chain
28 upper strand
29 lower strand
30 deflection zone
31 lines
32 base
33 driver
34 inextensible element
35 chain link
36 wider section
37 chain link without rollers
38 chain link with rollers
39 wider sections of the chain straps
40 guide grooves
41 bearing pin
42 circlip
43 ridges

What is claimed is:

1. An energy guiding chain for guiding cables or hoses, comprising:

a plurality of chain links connected to one another in articulated fashion, the chain links including parallel straps, and cross-members connecting the straps of a given chain link, the articulation permitting the chain to move in such a way so as to form an upper strand, a lower strand, and a deflection zone connecting said upper and lower strands, the straps having narrow sides that form top and bottom surfaces of the straps when the respective link is in the upper or lower strand, and wherein at least one said chain link includes two said cross-members at a distance from one another in the longitudinal direction of the chain on at least one narrow side of the chain straps;

wherein at least some of the chain links of at least one of the upper strand and the lower strand include rollers, and wherein at least some of the chain links of the other of the upper strand and the lower strand include running surfaces, the rollers being arranged such that when the energy guiding chain travels the rollers on one strand can roll on the running surfaces on the other strand.

2. An energy guiding chain according to claim 1, wherein the rollers have a guide profile, which is formed by several circumferential guide grooves positioned at a distance from one another in the running surface of the rollers.

3. An energy guiding chain according to claim 2, wherein the guide grooves have a trapezoidal cross-sectional profile.

4. An energy guiding chain according to claim 2, wherein the rollers project beyond running surfaces formed on the associated chain strap, and wherein the depth of the guide grooves is at least equal to the distance that the rollers project.

5. An energy guiding chain according to claim 1, wherein the running surfaces are formed by the narrow sides of the chain straps facing the opposite strand.

6. An energy guiding chain according to claim 1, wherein the rollers are located in recesses provided on the chain straps and project at least slightly beyond the chain straps.

7. An energy guiding chain according to claim 6, wherein at least some of the chain straps have an recess for accommodating a roller on one of the narrow sides and have a continuous running surface on the opposite narrow side, and wherein said chain straps are arrange to be mounted with one of the two narrow sides facing the opposite strand.

8. An energy guiding chain according to claim 6, wherein the rollers are mounted in the recesses of the chain straps by flanges having a bearing section.

9. An energy guiding chain according to claim 8, wherein some said chain straps have recesses without rollers, the chain further including means for bridging recesses which do not have rollers to prevent rollers from running into the recesses.

10. An energy guiding chain according to claim 1, wherein at least one said chain link includes at least two rollers mounted on one chain strap and spaced apart from one another in the longitudinal direction of the energy guiding chain.

11. An energy guiding chain according to claim 1, wherein the rollers project from running surfaces on the strap, the running surfaces including run-up bevels rising towards the rollers.

12. An energy guiding chain according to claim 1, wherein the rollers are mounted on the side of the chain straps projecting outward and wider sections of the chain straps projecting to the side are provided as running surfaces.

13. An energy guiding chain according to claim 12, wherein at least all the chain straps of one strand are provided with said wider sections which form a running surface, so that at least one essentially closed running surface is formed along the length of the energy guiding chain.

14. An energy guiding chain according to claim 1, wherein the chain links with rollers are mounted at intervals of more than one chain link.

15. An energy guiding chain according to claim 1, wherein the chain links with rollers are distributed over the length of the energy guiding chain at irregular intervals.

16. An energy guiding chain for guiding cables or hoses, comprising:
a plurality of chain links connected to one another in articulated fashion, the chain links including parallel straps, and cross-members connecting the straps of a given chain link, the chain straps having end sections overlapping with end sections of adjacent chain straps, the end sections being provided with joint sections to pivotably join adjacent straps, the articulation permitting the chain to move in such a way as to form an upper strand, a lower strand, and a deflection zone connecting said upper and lower strands, the straps having narrow sides that form top and bottom surfaces of the straps when the respective link is in the upper or lower strand, wherein at least one said chain link includes two said cross-members at a distance from one another in the longitudinal direction of the chain, wherein the cross-members are arranged adjacent at least one narrow side of the chain straps, and wherein at least one cross member is provided with lateral wider sections on its ends which partially cover opposed sides of straps of an adjacent chain link.

17. An energy guiding chain according to claim 16, wherein said cross-members are provided on one narrow side of a strap of said chain links, directly adjacent to the joint sections of said straps.

18. An energy guiding chain according to claim 16, comprising at least one element which is substantially inextensible in the longitudinal direction of the chain and is flexible in the bending direction of the chain, and which interconnects chain links in at least one area of the chain to the driver in tension-resisting fashion.

19. An energy guiding chain for guiding cables or hoses, comprising:
a plurality of chain links connected to one another in articulated fashion, the chain links including parallel straps, and cross-members connecting the straps of a given chain link, the straps being alternately arranged inner straps and outer straps connected to one another and having end sections overlapping with end sections of adjacent chain straps, the end sections being provided with joint sections to pivotably join adjacent straps, the articulation permitting the chain to move in such a way as to form an upper strand, a lower strand, and a deflection zone connecting said upper and lower strands, the straps having narrow sides that form top and bottom surfaces of the straps when the respective link is in the upper or lower strand, wherein at least one said chain link having outer straps includes two said cross-members at a distance from one another in the longitudinal direction of the chain, wherein the cross-members are arranged adjacent at least one narrow side of the chain straps, and wherein the cross-members arranged at the outer straps are provided with lateral wider sections on their ends which partially cover opposed sides of the inner straps of both adjacent guiding links.

20. An energy guiding chain for guiding cables or hoses, comprising:
a plurality of chain links connected to one another in articulated fashion, the chain links including parallel straps, and cross-members connecting the straps of a given chain link, the cross-members being mounted in detachable fashion on the chain straps which are provided with end sections overlapping with end sections of adjacent chain straps, the end sections being provided with joint sections to pivotably join adjacent straps, the articulation permitting the chain to move in such a way as to form an upper strand, a lower strand, and a deflection zone connecting said upper and lower strands, the straps having narrow sides that form top and bottom surfaces of the straps when the respective link is in the upper or lower strand, and wherein at least one said chain link includes two said cross-members at a distance from one another in the longitudinal direction of the chain arranged adjacent at least one narrow side of the chain straps.

21. An energy guiding chain for guiding cables or hoses, comprising:
a plurality of chain links connected to one another in articulated fashion, the chain links including parallel straps, and cross-members connecting the straps of a given chain link, the chain straps having end sections overlapping with end sections of adjacent chain straps, the end sections being provided with joint sections to pivotably join adjacent straps, the articulation permitting the chain to move in such a way as to form an upper strand, a lower strand, and a deflection zone connecting said upper and lower strands, the straps having narrow sides that form top and bottom surfaces of the straps when the respective link is in the upper or lower strand, wherein at least one said chain link includes at least one cross-member arranged adjacent a first narrow side of the chain strap and two said cross-members at a distance from one another in the longitudinal direction of the chain arranged adjacent a second narrow side of the respective chain strap opposite to the first narrow side, and wherein the cross-members arranged at opposite narrow sides are separate from each other defining a cable guide for guiding the cables between the at least one cross-member at the first narrow side and the cross members at the second narrow side.

22. An energy guiding chain for guiding cables or hoses, comprising:
a plurality of chain links connected to one another in articulated fashion, the chain links including parallel straps, and cross-members connecting the straps of a given chain link, the chain straps having end sections overlapping with end sections of adjacent chain straps, the end sections being provided with joint sections to pivotably join adjacent straps, the articulation permitting the chain to move in such a way so as to form an upper strand, a lower strand, and a deflection zone connecting said upper and lower strands, the straps having narrow sides that form top and bottom surfaces of the straps when the respective link is in the upper or lower strand, and wherein at least one said chain links includes two said cross-members at a distance from one another in the longitudinal direction of the chain arranged adjacent at least one narrow side of the chain straps, wherein at least one said chain link includes at least one cross-member arranged adjacent a first narrow side of the chain strap and two said cross-members at a distance from one another in the longitudinal direction of the chain arranged adjacent a second narrow side of the respective chain strap opposite to the first narrow side, wherein the cross-members are mounted in detachable fashion on the chain straps, the cross-members arranged at opposite narrow sides are separate from each other defining a cable guide for guiding the cables between the at least one cross-member at the first narrow side and the cross-members at the second narrow side.

23. An energy guiding chain for guiding cables or hoses, comprising:

a plurality of chain links connected to one another in articulated fashion, the chain links including parallel straps, and cross-members connecting the straps of a given chain link, the chain straps having end sections overlapping with end sections of adjacent chain straps, the end sections being provided with joint sections to pivotably join adjacent straps, the articulation permitting the chain to move in such a way so as to form an upper strand, a lower strand, and a deflection zone connecting said upper and lower strands, the straps having narrow sides that form top and bottom surfaces of the straps when the respective link is in the upper or lower strand, wherein at least one said chain link includes two said cross-members at a distance from one another in the longitudinal direction of the chain on at least one narrow side of the chain straps, wherein at least one said chain link includes at least one cross-member arranged adjacent a first narrow side of the chain strap and two said cross-members at a distance from one another in the longitudinal direction of the chain arranged adjacent a second narrow side of the respective chain strap opposite to the first narrow side, wherein the cross-members are mounted in detachable fashion on the chain straps, and wherein at least one cross-member is provided with wider sections on its ends which partially cover opposed sides of the straps of an adjacent guiding link.

* * * * *